US012144778B2

(12) United States Patent
Reynolds et al.

(10) Patent No.: US 12,144,778 B2
(45) Date of Patent: Nov. 19, 2024

(54) CPR COMPRESSION DEVICE WITH COOLING SYSTEM AND BATTERY REMOVAL DETECTION

(71) Applicant: ZOLL CIRCULATION, INC., San Jose, CA (US)

(72) Inventors: Byron J. Reynolds, San Jose, CA (US); David T. Lawrence, San Jose, CA (US); Ian Smith, San Jose, CA (US)

(73) Assignee: ZOLL Circulation, Inc., San Jose, CA (US)

(*) Notice: Subject to any disclaimer, the term of this patent is extended or adjusted under 35 U.S.C. 154(b) by 440 days.

(21) Appl. No.: 17/133,100

(22) Filed: Dec. 23, 2020

(65) Prior Publication Data

US 2021/0186806 A1 Jun. 24, 2021

Related U.S. Application Data

(63) Continuation of application No. 15/942,309, filed on Mar. 30, 2018, now Pat. No. 10,905,629.

(51) Int. Cl.
*A61H 31/00* (2006.01)
*A61H 11/00* (2006.01)

(52) U.S. Cl.
CPC ......... *A61H 31/006* (2013.01); *A61H 31/005* (2013.01); *A61H 31/007* (2013.01); *A61H 2011/005* (2013.01); *A61H 2205/084* (2013.01)

(58) Field of Classification Search
CPC .. A61H 31/006; A61H 31/005; A61H 31/007; A61H 2011/005; A61H 2205/084; A61H 31/008; A61H 2201/1215; A61H 31/00; A61H 2201/1207; A61H 2201/1621; A61H 2201/50; A61H 2201/5007; A61H 2201/5023; A61H 2201/5028; A61H 2201/5043; A61H 2201/5058;
(Continued)

(56) References Cited

U.S. PATENT DOCUMENTS 443,204 A 12/1890 Davis
651,962 A 6/1900 Boghean
(Continued)

FOREIGN PATENT DOCUMENTS

KR 1020020097386 12/2002
WO WO9722327 6/1997
(Continued)

OTHER PUBLICATIONS

International Search Report and Written Opinion for International Application No. PCT/US2019/024927 mailed Aug. 27, 2019. (previously submitted in related U.S. Appl. No. 15/942,309).
(Continued)

*Primary Examiner* — Kendra D Carter
*Assistant Examiner* — Arielle Wolff
(74) *Attorney, Agent, or Firm* — ZOLL Circulation, Inc.

(57) ABSTRACT

A CPR chest compression device with a cooling exhaust flow path configured to direct cooling air flow through the device. A CPR chest compression device with a battery retainer interoperable with the control system to provide for controlled shut-down when an operator attempts to remove the battery during operation.

20 Claims, 5 Drawing Sheets

(58) Field of Classification Search
CPC .... A61H 2201/5066; A61H 2201/5092; A61H 2203/0456
See application file for complete search history.

(56) References Cited

U.S. PATENT DOCUMENTS 2,071,215 A 2/1937 Petersen
2,255,684 A 9/1941 Smith
2,486,667 A 11/1949 Meister
2,699,163 A 1/1955 Engstrom
2,754,817 A 7/1956 Nemeth
2,780,222 A 2/1957 Polzin et al.
2,853,998 A 9/1958 Emerson
2,899,955 A 8/1959 Huxley, III et al.
2,910,264 A 10/1959 Lindenberger
3,042,024 A 7/1962 Mendelson
3,095,873 A 7/1963 Edmunds
3,120,228 A 2/1964 Huxley, III
3,359,851 A 12/1967 Lipschutz et al.
3,586,760 A 12/1967 Dillenburger
3,368,550 A 2/1968 Glascock
3,374,783 A 3/1968 Hurvitz
3,461,860 A 8/1969 Barkalow et al.
3,481,327 A 12/1969 Drennen
3,503,388 A 3/1970 Cook
3,514,065 A 5/1970 Donaldson et al.
3,718,751 A 2/1973 Landre et al.
3,748,471 A 7/1973 Ross et al.
3,753,822 A 8/1973 Heinrich
3,777,744 A 12/1973 Fryfogle et al.
3,782,371 A 1/1974 Derouineau
3,802,638 A 4/1974 Dragan
3,822,840 A 7/1974 Stephenson
3,835,847 A 9/1974 Smith
3,896,797 A 7/1975 Bucur
3,902,480 A 9/1975 Wilson
4,004,579 A 1/1977 Dedo
4,058,124 A 11/1977 Yen et al.
4,155,537 A 5/1979 Bronson et al.
4,185,902 A 1/1980 Plaot
4,241,675 A 12/1980 Bardsley
4,241,676 A 12/1980 Parsons et al.
4,273,114 A 6/1981 Barkalow et al.
4,291,686 A 9/1981 Miyashiro
4,315,906 A 2/1982 Gelder
4,338,924 A 7/1982 Bloom
4,349,015 A 9/1982 Alfeness
4,365,623 A 12/1982 Wilhelm et al.
4,397,306 A 8/1983 Weisfeldt et al.
4,409,614 A 10/1983 Eichler et al.
4,424,806 A 1/1984 Newman et al.
4,453,538 A 6/1984 Whitney
4,471,898 A 9/1984 Parker
4,477,807 A 10/1984 Nakajima et al.
4,491,078 A 1/1985 Ingram
4,522,132 A 6/1985 Slattery
4,540,427 A 9/1985 Helbling
4,570,615 A 2/1986 Barkalow
4,619,265 A 10/1986 Morgan et al.
4,655,312 A 4/1987 Frantom et al.
4,664,098 A 5/1987 Woudenberg et al.
4,739,717 A 4/1988 Bardsley
4,753,226 A 6/1988 Zheng et al.
4,770,164 A 9/1988 Lach et al.
4,827,334 A 5/1989 Johnson et al.
4,835,777 A 5/1989 DeLuca et al.
4,915,095 A 4/1990 Chun
4,928,674 A 5/1990 Halperin et al.
4,930,517 A 6/1990 Cohen et al.
4,987,783 A 1/1991 D'Antonio et al.
5,014,141 A 5/1991 Gervais et al.
5,025,794 A 6/1991 Albert et al.
5,043,718 A 8/1991 Shimura
5,056,505 A 10/1991 Warwick et al.
5,075,684 A 12/1991 DeLuca
5,093,659 A 3/1992 Yamada
5,098,369 A 3/1992 Hellman et al.
5,140,561 A 8/1992 Miyashita et al.
5,184,606 A 2/1993 Csorba
5,217,010 A 6/1993 Tsitlik et al.
5,222,478 A 6/1993 Scarberry et al.
5,228,449 A 7/1993 Christ et al.
5,257,619 A 11/1993 Everete
5,262,958 A 11/1993 Chui et al.
5,277,194 A 1/1994 Hosterman et al.
5,287,846 A 2/1994 Capjon et al.
5,295,481 A 3/1994 Greeham
5,318,262 A 6/1994 Adams
5,327,887 A 7/1994 Nowakowski
5,359,999 A 11/1994 Kinsman
5,370,603 A 12/1994 Newman
5,372,487 A 12/1994 Pekar
5,399,148 A 3/1995 Waide et al.
5,402,520 A 3/1995 Schnitta
5,405,362 A 4/1995 Kramer et al.
5,411,518 A 5/1995 Goldstein et al.
5,421,342 A 6/1995 Mortara
5,451,202 A 9/1995 Miller et al.
5,474,533 A 12/1995 Ward et al.
5,474,574 A 12/1995 Payne et al.
5,490,820 A 2/1996 Schock et al.
5,496,257 A 3/1996 Kelly
5,513,649 A 5/1996 Gevins et al.
5,520,622 A 5/1996 Bastyr et al.
5,524,843 A 6/1996 McCauley
5,582,580 A 12/1996 Buckman et al.
5,593,426 A 1/1997 Morgan et al.
5,620,001 A 4/1997 Byrd et al.
5,630,789 A 5/1997 Schock et al.
5,660,182 A 8/1997 Kuroshaki et al.
5,664,563 A 9/1997 Schroeder et al.
5,704,365 A 1/1998 Albrecht et al.
5,738,637 A 4/1998 Kelly et al.
5,743,864 A 4/1998 Baldwin, II
5,769,800 A 6/1998 Gelfand et al.
5,806,512 A 9/1998 Abramov et al.
5,831,164 A 11/1998 Reddi et al.
5,860,706 A 1/1999 Fausel
5,876,350 A 3/1999 Lo et al.
5,978,693 A 11/1999 Hamilton et al.
5,999,852 A 12/1999 Elabbady et al.
6,016,445 A 1/2000 Baura
6,066,106 A 5/2000 Sherman et al.
6,090,056 A 7/2000 Bystrom et al.
6,125,299 A 9/2000 Groenke et al.
6,142,962 A 11/2000 Mollenauer et al.
6,171,267 B1 1/2001 Baldwin, II
6,174,295 B1 1/2001 Cantrell et al.
6,213,960 B1 4/2001 Sherman et al.
6,263,238 B1 7/2001 Brewer et al.
6,306,107 B1 10/2001 Myklebust et al.
6,344,623 B1 2/2002 Yamazaki et al.
6,360,602 B1 3/2002 Tazartes et al.
6,366,811 B1 4/2002 Carlson
6,367,478 B1 4/2002 Riggs
6,390,996 B1 5/2002 Halperin et al.
6,398,745 B1 6/2002 Sherman et al.
6,411,843 B1 6/2002 Zarychta
6,453,272 B1 9/2002 Slechta
6,599,258 B1 7/2003 Bystrom et al.
6,616,620 B2 9/2003 Sherman et al.
6,640,134 B2 10/2003 Raymond et al.
6,647,287 B1 11/2003 Peel, III et al.
6,690,616 B1 2/2004 Bahr et al.
6,709,410 B2 3/2004 Sherman et al.
6,807,442 B1 10/2004 Myklebust et al.
6,869,408 B2 3/2005 Sherman et al.
6,939,314 B2 9/2005 Hall et al.
6,939,315 B2 9/2005 Sherman et al.
7,104,967 B2 9/2006 Rothman et al.
7,108,665 B2 9/2006 Halperin et al.
7,220,235 B2 5/2007 Geheb et al.
7,226,427 B2 6/2007 Steen
7,270,639 B2 9/2007 Jensen et al.

(56) References Cited

U.S. PATENT DOCUMENTS

| | | | |
|---|---|---|---|
| 7,347,832 B2 | 3/2008 | Jensen et al. | |
| 7,354,407 B2 | 4/2008 | Quintana et al. | |
| 7,374,548 B2 | 5/2008 | Sherman et al. | |
| 7,404,803 B2 | 7/2008 | Katz et al. | |
| 7,410,470 B2 | 8/2008 | Escudero et al. | |
| 7,429,250 B2 | 9/2008 | Halperin et al. | |
| 7,517,325 B2 | 4/2009 | Halperin | |
| 7,569,021 B2 | 8/2009 | Sebelius et al. | |
| 7,602,301 B1 | 10/2009 | Stirling et al. | |
| 7,666,153 B2 | 2/2010 | Hall et al. | |
| 7,841,996 B2 | 11/2010 | Sebelius et al. | |
| 8,062,239 B2 | 11/2011 | Sherman et al. | |
| 8,641,647 B2 | 2/2014 | Illindala et al. | |
| 8,690,804 B2 | 4/2014 | Nilsson et al. | |
| 8,753,298 B2 | 6/2014 | Sebelius et al. | |
| 10,905,629 B2 | 2/2021 | Reynolds et al. | |
| 2001/0011159 A1 | 8/2001 | Cantrell et al. | |
| 2001/0018562 A1 | 8/2001 | Sherman et al. | |
| 2001/0047140 A1 | 11/2001 | Freeman | |
| 2002/0026131 A1 | 2/2002 | Halperin | |
| 2002/0055694 A1 | 5/2002 | Halperin et al. | |
| 2002/0077560 A1 | 6/2002 | Kramer et al. | |
| 2002/0088893 A1 | 7/2002 | Nichols | |
| 2002/0133197 A1 | 9/2002 | Snyder et al. | |
| 2002/0147534 A1 | 10/2002 | Delcheccolo et al. | |
| 2003/0171661 A1 | 9/2003 | Tong | |
| 2003/0181834 A1 | 9/2003 | Sebelius et al. | |
| 2004/0030272 A1 | 2/2004 | Kelly et al. | |
| 2004/0087839 A1 | 5/2004 | Raymond et al. | |
| 2004/0116840 A1 | 6/2004 | Cantrall et al. | |
| 2004/0162510 A1 | 8/2004 | Jayne et al. | |
| 2004/0210172 A1 | 10/2004 | Palazzolo et al. | |
| 2004/0220501 A1 | 11/2004 | Kelly et al. | |
| 2007/0010764 A1 | 1/2007 | Palazzolo et al. | |
| 2007/0270725 A1 | 11/2007 | Sherman et al. | |
| 2007/0276298 A1 | 11/2007 | Sebelius et al. | |
| 2008/0045867 A1* | 2/2008 | Jensen | A61H 31/006 601/41 |
| 2008/0119766 A1 | 5/2008 | Havardsholm et al. | |
| 2008/0146975 A1 | 6/2008 | Ho et al. | |
| 2008/0300518 A1 | 12/2008 | Bowes | |
| 2009/0187123 A1 | 7/2009 | Hwang et al. | |
| 2009/0204035 A1 | 8/2009 | Mollenauer et al. | |
| 2009/0204036 A1 | 8/2009 | Halperin | |
| 2009/0260637 A1 | 10/2009 | Sebelius et al. | |
| 2010/0004571 A1 | 1/2010 | Nilsson et al. | |
| 2010/0004572 A1 | 1/2010 | King | |
| 2010/0063425 A1 | 3/2010 | King et al. | |
| 2010/0174216 A1 | 7/2010 | Jensen et al. | |
| 2010/0185127 A1 | 7/2010 | Nilsson et al. | |
| 2011/0040217 A1 | 2/2011 | Center | |
| 2011/0201979 A1 | 8/2011 | Voss et al. | |
| 2011/0308534 A1 | 12/2011 | Sebelius et al. | |
| 2011/0319797 A1 | 12/2011 | Sebelius et al. | |
| 2012/0083720 A1 | 4/2012 | Centen et al. | |
| 2012/0226205 A1 | 9/2012 | Sebelius et al. | |
| 2012/0238922 A1 | 9/2012 | Stemple et al. | |
| 2012/0274266 A1* | 11/2012 | Yip | H02J 7/00036 320/106 |
| 2012/0283608 A1 | 11/2012 | Nilsson et al. | |
| 2013/0060172 A1 | 3/2013 | Palazzolo et al. | |
| 2013/0060173 A1 | 3/2013 | Palazzolo et al. | |
| 2013/0123673 A1 | 5/2013 | Sherman et al. | |
| 2013/0218055 A1 | 8/2013 | Fossan | |
| 2014/0121576 A1 | 5/2014 | Nilsson et al. | |
| 2014/0155793 A1 | 6/2014 | Illindala et al. | |
| 2014/0180180 A1 | 7/2014 | Nilsson et al. | |
| 2014/0207031 A1 | 7/2014 | Sebelius et al. | |
| 2014/0236054 A1 | 8/2014 | Jensen et al. | |
| 2014/0276269 A1 | 9/2014 | Illindala | |
| 2014/0303530 A1 | 10/2014 | Nilsson et al. | |
| 2014/0343466 A1 | 11/2014 | Herken et al. | |
| 2015/0057580 A1 | 2/2015 | Illindala | |
| 2015/0094624 A1 | 4/2015 | Illindala | |
| 2015/0105705 A1 | 4/2015 | Freeman | |
| 2015/0148717 A1 | 5/2015 | Halperin | |
| 2016/0287470 A1 | 10/2016 | Lewis et al. | |
| 2017/0005547 A1* | 1/2017 | Chou | F04B 39/066 |
| 2017/0105897 A1 | 4/2017 | Joshi et al. | |
| 2017/0172845 A1* | 6/2017 | Walden | A61H 31/006 |
| 2017/0225109 A1 | 8/2017 | Gerken et al. | |
| 2017/0281460 A1 | 10/2017 | Zgoda et al. | |
| 2018/0358870 A1* | 12/2018 | Kawanami | A61H 1/0266 |
| 2019/0298606 A1 | 10/2019 | Reynolds et al. | |

FOREIGN PATENT DOCUMENTS

| | | |
|---|---|---|
| WO | WO0215836 | 2/2002 |
| WO | WO2019191641 | 10/2019 |

OTHER PUBLICATIONS

Annex to Form PCT/ISA/206 Communication Relating to the Results of the Partial International Search dated Jun. 26, 2019 from IA PCT/US2019/024927 (previously submitted in related U.S. Appl. No. 15/942,309).

Non-Final Office Action issued on Apr. 28, 2020 in U.S. Appl. No. 15/942,309.

Notice of Allowance issued on Sep. 11, 2020 in U.S. Appl. No. 15/942,309.

* cited by examiner

CPR COMPRESSION DEVICE WITH COOLING SYSTEM AND BATTERY REMOVAL DETECTION

RELATED APPLICATIONS

This application is a continuation of U.S. Non-Provisional application Ser. No. 15/942,309, entitled "CPR COMPRESSION DEVICE WITH COOLING SYSTEM AND BATTERY REMOVAL DETECTION," (now U.S. Pat. No. 10,905,629) and filed Mar. 30, 2018. All above-identified applications are hereby incorporated by reference in their entireties.

FIELD

The inventions described below relate to the field of CPR chest compression devices.

BACKGROUND

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. In efforts to provide better blood flow and increase the effectiveness of bystander resuscitation efforts, various mechanical devices have been proposed for performing CPR. In one type of mechanical chest compression device, a belt is placed around the patient's chest and the belt is used to effect chest compressions, for example our commercial device, sold under the trademark AUTOPULSE®.

These devices have proven to be valuable alternatives to manual CPR. The devices provide chest compressions at resuscitative rates and depths. A resuscitative rate may be any rate of compressions considered effective to induce blood flow in a cardiac arrest victim, typically 60 to 120 compressions per minute (the CPR Guidelines 2015 recommends 100 to 120 compressions per minute in adult victims), and a resuscitative depth may be any depth considered effective to induce blood flow, and typically 1.5 to 2.5 inches (the CPR Guidelines 2015 recommends 2 to 2.4 inches per compression in adults).

SUMMARY

It would be advantageous in a CPR chest compression device to provide for cooling of heat generating components such as the motor and the battery. The motor and battery both generate heat during operation the chest compression device, and it is advantageous to avoid excessive heating. The devices and methods described below provide for improved cooling in a CPR chest compression device. The chest compression device includes a housing configuration with baffles establishing a flow path over the battery and motor of the device, and exhaust fans which draw air from the vicinity of the motor to direct exhaust flow out of exhaust ports on the side of the housing.

On another front, it is advantageous to record operating data from the CPR chest compression device during use. This data may include the operating start times and stop times, battery life data or other battery metrics, compression rates, compression depths, total compressions applied and compressions pauses used, and other quality metrics. This data may be used for diagnosis of the patient, analysis of the effectiveness of compressions, and analysis of the operations of the chest compression device itself. Sudden loss of power to the control system can disrupt data collection, and result in loss of data collected, and it would be advantageous to prevent removal of the battery in order to replace it from causing loss of data.

The CPR chest compression device can include a compression device housing which houses various components including a drive spool and motor for rotating the drive spool, a motor with its motor housing, a fan disposed within the compression device housing, and a pathway for cooling airflow which includes an intake aperture and an exhaust aperture. The fan is disposed within the compression device housing, proximate a second end of the motor housing, between the second end of the motor housing and the exhaust aperture of the compression device housing, arranged to draw air from the second end of the motor housing and force air out the exhaust aperture of the compression device housing. The enclosure formed by the compression device housing may be configured with internal surfaces to direct air drawn by the fan through the compression device intake aperture, to an aperture in the motor housing.

The devices and methods described below provide for controlled shut-down of the CPR chest compression device when an operator attempts to remove the battery during operation, as might happen when the control system determines that the battery in use is nearing depletion or exhaustion, or the operator determines that a battery in use is nearing depletion or exhaustion. This is accomplished with a battery retainer mechanism, e.g., a latching mechanism, holding the battery in place, imposing an inherent short delay in removal, along with a detection mechanism which detects an attempt during the beginning of the removal process, with the control system programmed to recognize detection of a removal and operate to save data to a storage device, which may comprise fixed media, storage media, removable media, non-removable media, or memory including non-volatile memory and operate the system to ensure that the data is recoverable.

The CPR chest compression device can include a mechanism for detecting an attempt to remove its battery, and placing the control system in a safe condition, including completing the writing of collected patient and/or device data to a storage device, which may comprise fixed media, storage media, removable media, non-removable media, or memory including non-volatile memory, and/or ceasing further writing, before the battery is removed by a user. In a system where the control system is configured to control the chest compression device and write patient data and/or device data detected by sensors associated with the system to a storage device, a battery retainer may be configured to provide a signal to the control system indicating an attempt to remove the battery, and the control system can be correspondingly programmed to receive the signal and save data and cease writing data within a predetermined period which is shorter than the time required to complete battery removal. This system comprises a mechanical retaining structure for retaining the battery, configured to secure the battery to the chest compression device. The battery retainer may be operable by the user to release the battery from the chest compression device, wherein operation by the user to release the battery from the chest compression device requires moving the mechanical retaining structure through a range of motion, including an initial range of motion less than a full range of motion required to release the battery from the chest compression device. A sensor for detecting a motion of the mechanical retaining structure at a point in the range of motion prior to release of the battery (an initial range of motion), and the sensor operable to generate a signal indicative of said motion and transmit said signal to the control system. The control system is operable to receive the signal indicative of the motion and is programmed to cease writing patient data and/or device data to the storage device upon receiving the signal indicative of said motion. e the control system may be operable to (1) complete any writing in progress when the signal indicative of the motion is received, and (2) cease further writing of patient data and/or device data to the storage device upon receiving the signal indicative of the motion, within the predetermined time period, and the battery retainer is further configured such that the time required for a user to move the mechanical retaining structure from the initial range of motion through the full range of motion exceeds the predetermined time period.

DETAILED DESCRIPTION

Figure 1:
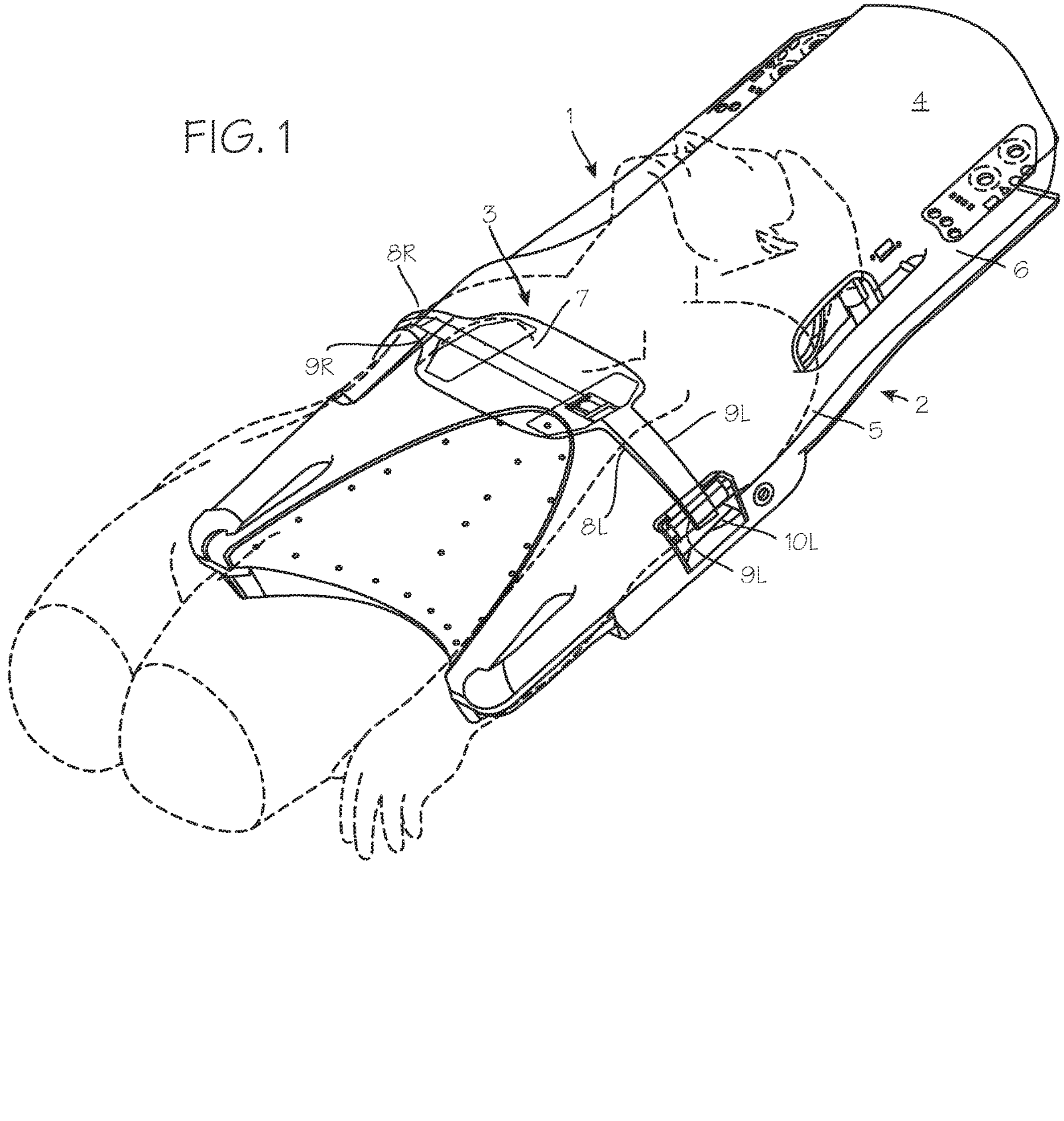
FIG. 1 illustrates the CPR chest compression device installed on a patient.

FIG. 1 shows a chest compression device fitted on a patient 1. The chest compression device 2 applies compressions with the compression belt 3. The chest compression device 2 includes a belt drive platform 4 sized for placement under the thorax of the patient, upon which the patient rests during use and which provides a housing 5 for the drive train and control system for the device. The control system, provided anywhere in the device, can include a processor and may be operable to control tightening or loosening operation of the belt and to provide output on a user interface disposed on the housing. Operation of the device can be initiated and adjusted by a user through a control panel 6 and/or a display operated by the control system to provide feedback regarding the status of the device to the user. The control system is configured to control the device to perform repeated compression cycles when the device is fitted about a patient's chest. A compression cycle includes a downstroke, an upstroke (a release portion), and perhaps some delay between a downstroke and a successive upstroke, or between an upstroke and a successive downstroke. In the operation of the AUTOPULSE® chest compression device, the system operates to take up slack in the belt upon initial start-up, equates the rotational position of the drive spool at this point as the slack take-up position, and begins each downstroke from this position.

The belt includes a wide load-distribution section 7 at the mid-portion of the belt and left and right belt ends 8R and 8L (shown in the illustration as narrow pull straps 9R and 9L), which serve as tensioning portions which extend from the load distributing portion, posteriorly relative to the patient, to drive spools within or on the housing. When fitted on a patient, the load distribution section is disposed over the anterior chest wall of the patient, and the left and right belt ends extend posteriorly over the right and left axilla of the patient to connect to their respective lateral drive spools shown in FIG. 2.

Figure 2:
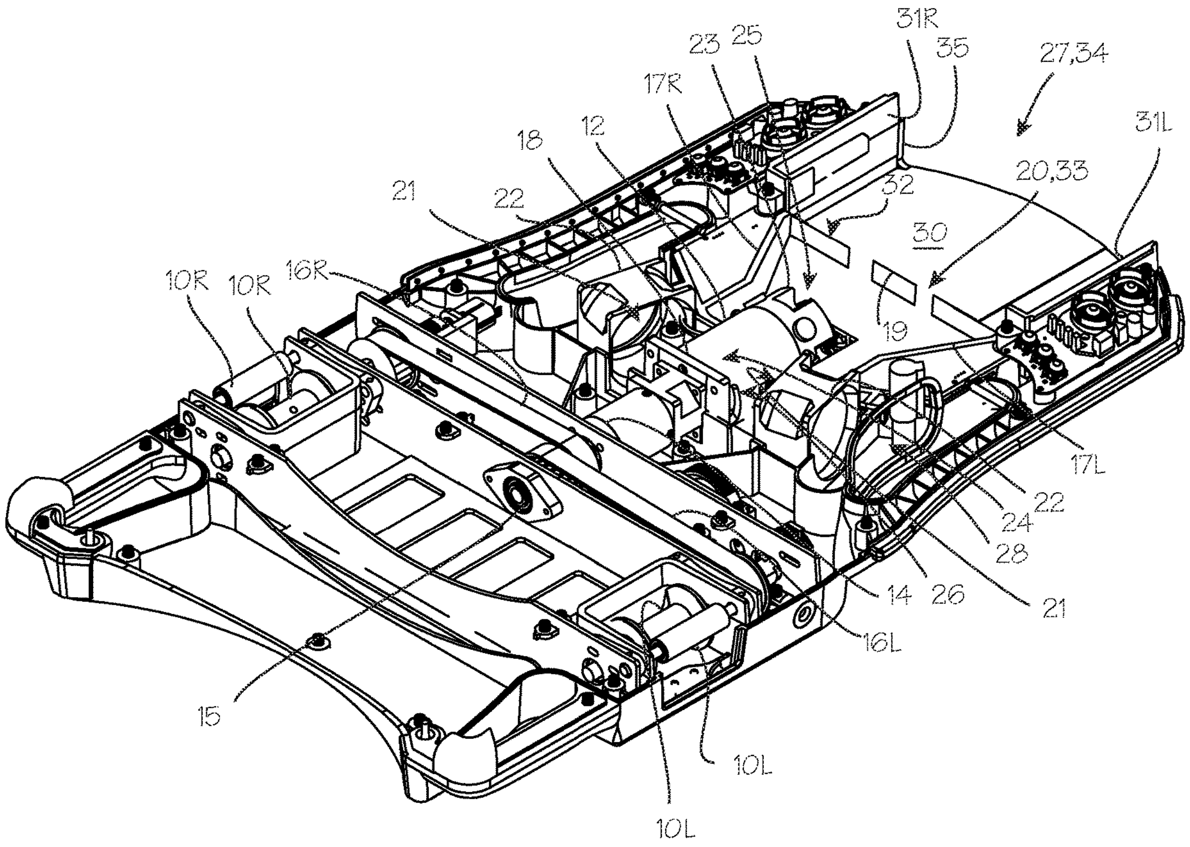
FIG. 2 is a perspective view of the CPR chest compression device, illustrating the cooling intake baffles and outlet baffles within of the housing.
Figure 3:
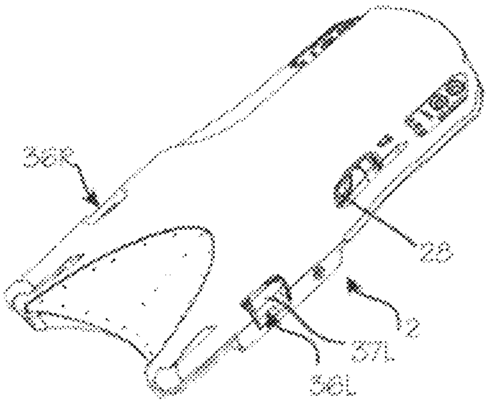
FIG. 3 is a perspective view of the CPR chest compression device, illustrating the apertures in the housing for cooling flow exhaust.

FIGS. 2 and 3 shows the CPR chest compression device in isolation. FIG. 2 provides a view of the device with the housing anterior surface hidden. As illustrated in FIG. 2, drive spools 10R and 10L are disposed laterally on either side of the housing. The belt pulls straps 9R and 9L (shown in FIG. 1) are secured to these drive spools, locked into channels 11 running longitudinally along the drive spools. The lateral drive spools are in turn driven by a motor 12 also disposed within the housing, through a motor shaft 13, a transmission 14, a drive shaft 15 and drive belts 16R and 16L. The belt pull straps 9R and 9L are attached to the lateral drive spools such that, upon rotation of the drive spools, the pull straps 9R and 9L are pulled posteriorly, spooled upon the lateral spools, thereby drawing the compression belt downward to compress the chest of the patient.

Features of the ventilation system are also illustrated in FIG. 2. The motor 12 is disposed within a motor enclosure bounded by side walls 17R and 17L and an inferior wall 18, and a superior wall 19. An inlet to the motor compartment is provided by one or more motor compartment inlet apertures 20. (The motor compartment inlet aperture may be the same as the chest compression housing intake aperture 27.) An outlet for the motor enclosure is provided by an exhaust aperture 21. An exhaust fan 22, proximate the exhaust aperture, is operable to draw air from the motor enclosure and force it out of the motor enclosure through the exhaust aperture. The motor itself is characterized by a motor housing, a first end 23 and a second end 24, with the motor shaft 13 disposed at the second end, and a motor housing inlet aperture 25 in the motor housing proximate the first end, and a motor housing outlet aperture 26 in the motor housing proximate the second end.

The compression device housing is configured to support the patient during operation of the CPR compression device, and also forms an enclosure substantially enclosing the motor. The compression device housing has an intake aperture 27 for intake of cooling airflow and exhaust aperture 28 for exhaust of cooling airflow. An inlet aperture and an exhaust aperture may be provided on each side of the device.

The fan 22 is disposed within the compression device housing, proximate the second end of the motor housing and between the second end 24 of the motor housing and the exhaust aperture 28. The fan is arranged to draw air from the second end of the motor housing and force air out the exhaust aperture of the compression device housing. Alternatively, the fan can be reversed, to draw or force air into the second end of the motor and out of the first end of the motor, or draw air from aperture 28 and force air out of aperture 27. The fan and/or exhaust aperture may instead be disposed at the first end of the motor with an intake aperture proximate the second end of the motor housing, and may also be integral to the motor. One fan may be used on each side of the housing, as shown, or a single fan may be used. The control system may control the fan(s) to operate continuously, or intermittently as necessary to cool the device, independent of the operation of the motor.

Figure 4:
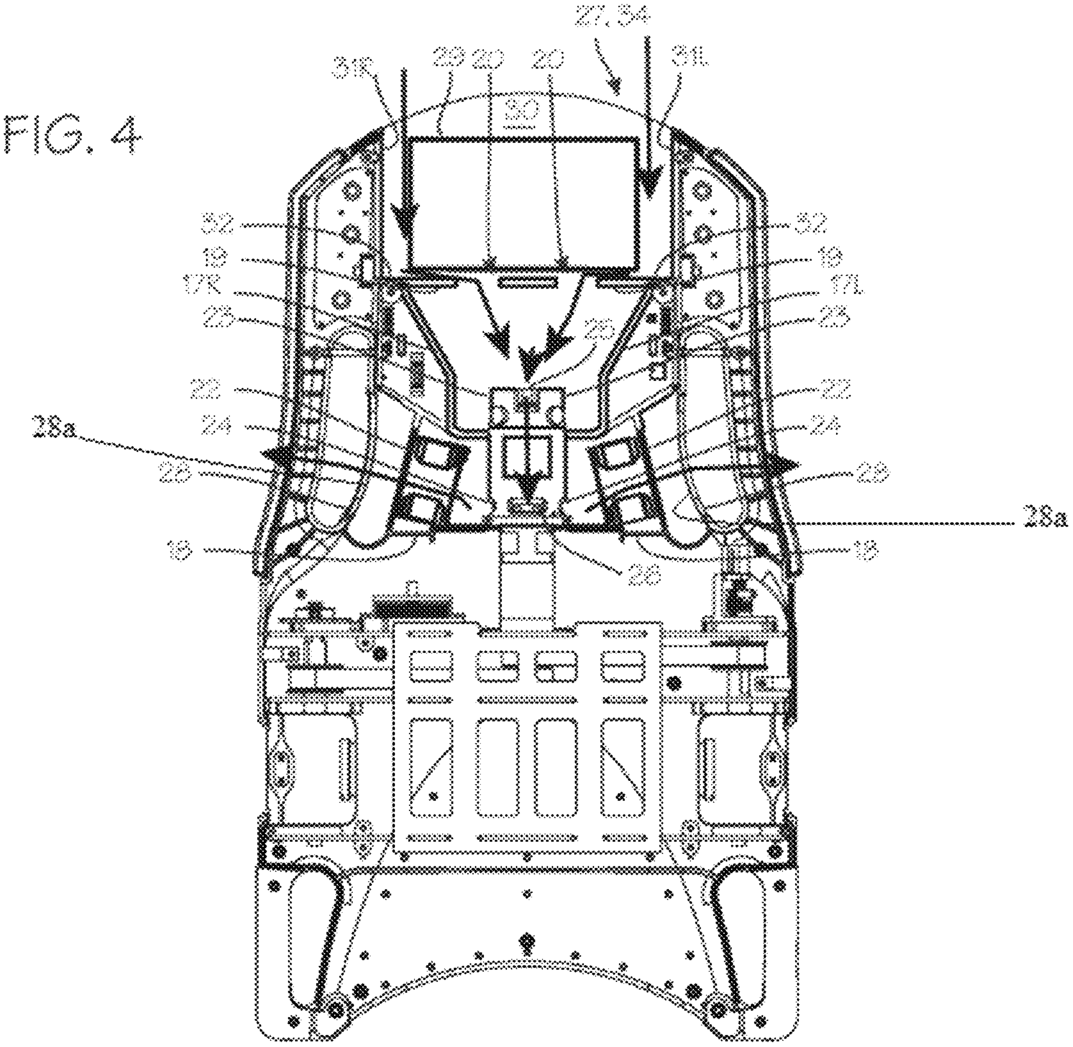
FIG. 4 is an anterior view of the CPR chest compression device, illustrating the cooling intake baffles and outlet baffles within of the housing.

Further referring to FIG. 2 and FIG. 4, to provide cooling flow to the battery, the compression device housing can be configured so as to place the battery in the cooling flow pathway. The battery 29 fits in a battery compartment 30 bounded by side walls 31R and 31L and an inferior wall 32, with an aperture 33 leading to the motor housing, and an intake aperture 34 formed in the superior surface 35 above the battery which allows for insertion and removal of the battery. The superior intake aperture in this embodiment is in fluid communication with s the housing intake aperture 27 identified above. (This superior aperture may be a gap between a battery cover and the compression device housing, as illustrated below, or a gap in the battery cover.) The battery is configured relative to the battery compartment so as to define a flow path for air from the intake aperture 34 of the compression device housing to the first aperture of the motor housing. The battery may be sized relative to the battery compartment so that the flow path is defined between a surface of the battery and an internal surface of the compression device housing, or the battery may be configured with a channel running through the battery, so that the channel defines the flow path.

The various walls and surfaces may be disposed within the compression device housing, between the intake aperture of the compression device housing and the first end of the motor housing, configured to serve as baffles to direct air drawn by the fan through the intake aperture of the compression device housing to the motor, including to the first aperture of the motor housing (with the configuration adjusted depending on whether the motor housing first aperture is also the intake aperture of the compression device housing, or the motor housing first aperture is downstream from the battery disposed between the motor and the intake aperture of the compression device housing. The intake aperture of the compression device housing may be located in the compression device housing such that it sits behind the battery (when the battery is inserted into the chest compression device), with a gap remaining between the intake aperture of the chest compression device and the battery cover, to allow for the flow/passage of air. This positioning of the compression device intake aperture helps protect or shield the compression device intake aperture from being blocked or obstructed, which could result in the overheating of or damage to the motor and compression device. The location of the intake aperture may be recessed relative to a posterior surface of the chest compression device housing.

Other walls that separate the battery compartment from the first end of the motor, disposed between the intake aperture of the compression device housing and the first motor end, having an aperture communicating from the battery compartment to the first end of the motor, define a second baffle within the compression device housing. The enclosure formed by the compression device housing is configured with internal surfaces to direct air drawn by the fan through the intake aperture of the chest compression device housing, to the first aperture in the motor housing (if they are distinct) and further configured with internal surfaces to direct air drawn by the fan from the second aperture in the motor housing, through the fan, and out the exhaust aperture. The battery compartment internal surface may also be configured to prevent air drawn by the fan through the intake aperture of the compression device housing from flowing through the battery compartment along pathways not at least partially defined by the battery configured for insertion into the battery compartment.

Various motors may be utilized, e.g., the motor may be a brushed DC motor, with a commutator and brush assembly disposed at the first end (opposite the motor shaft).

FIG. 3 is a perspective view of the CPR chest compression device, illustrating the apertures in the compression device housing which provide for access to the drive spool for connecting the belt to the drive spool. The apertures 36R and 36L on either side of the housing are disposed proximate the drive spools. The apertures are sized to allow passage of the belt end through the housing wall for insertion into the drive spools. The apertures can extend over the housing anterior surface 5A and lateral surface 5L as shown, or over the housing anterior surface 5A alone, or the lateral surface 5L alone, to preferably provide access to the drive spools from an anterior approach or lateral approach even while a patient is disposed on the anterior surface. Spindles 37R and 37L may be provided to guide the belt ends through the apertures.

FIG. 3 also illustrates the position of the exhaust apertures 28 of the housing, which, in this embodiment, are distinct from the apertures used to access the drive spools. The drive spool apertures are isolated from the ventilation flow by the inferior wall 18 of the motor compartment.

The several apertures, including the compression device housing intake aperture 27, the compression device housing exhaust aperture 28, and the motor compartment inlet aperture 20 or the motor compartment exhaust aperture 21, can be covered with a hydrophobic mesh 28*a*.

FIG. 4 is an anterior view of the CPR chest compression device, illustrating the cooling intake baffles and outlet baffles within of the housing. This figure more clearly shows the location of the motor enclosure side walls 17R and 17L, inferior wall 18, superior wall 19, motor compartment inlet aperture 20 and motor compartment exhaust aperture 21. Portions of the motor include the motor first end, motor second end, and the motor housing inlet aperture 25 in the motor housing proximate the first end, and a motor housing outlet aperture 26. The compression device intake aperture 27 and exhaust aperture 28, and the fan 22 are also shown. The walls 31R, 31L and 32 of the battery compartment 30 are also shown in this view.

Figure 5:
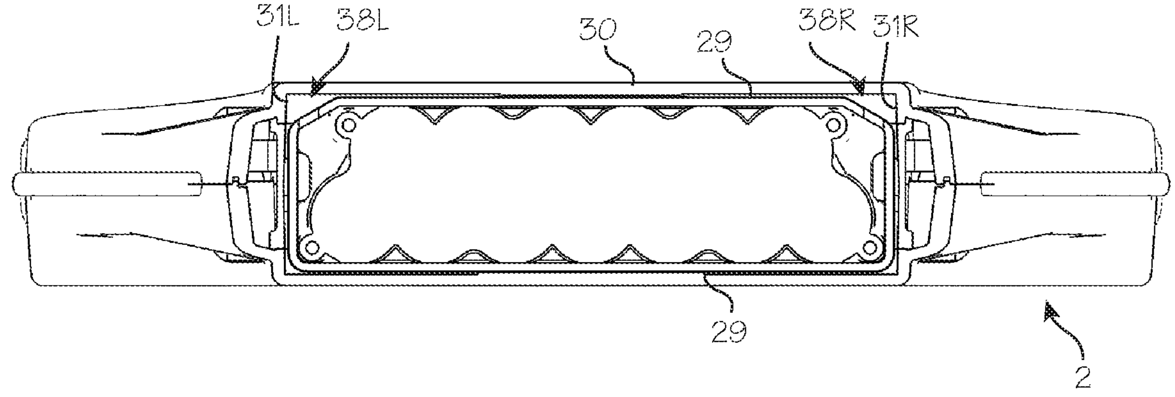
FIG. 5 is a top/superior view of the CPR chest compression device, illustrating the cooling intake flow path between the housing baffles and the battery.

FIG. 5 is a top/superior view of the CPR chest compression device 2, illustrating the cooling intake flow path between the compression device housing baffles and the battery. This view shows the battery 29 within the battery compartment 30, bounded by the side walls 31R and 31L. The small gaps 38 between the battery and the walls of the battery compartment provide a flow path for cooling air over the battery.

The CPR chest compression device can include a mechanism for detecting an attempt to remove its battery, and placing the control system in a safe condition, including completing the writing of collected patient and/or device data to a storage device, and ceasing further writing, before the battery is removed, or electrically disconnected by a user. In a system where the control system is configured to control the chest compression device and write patient data and/or device data detected by sensors associated with the system to a storage device, a battery retainer may be configured to provide a signal to the control system indicating an attempt to remove the battery, and the control system can be correspondingly programmed to receive the signal and save data and cease writing data within a predetermined period which is shorter than the time required to complete battery removal or move the battery sufficient to electrically disconnect the battery from the compression device. This system comprises a retaining structure, e.g., mechanical, for retaining the battery, configured to secure the battery to the chest compression device. The battery retainer may be automated or manually operable by the user to release the battery from the chest compression device. In certain embodiments operation by the user to release the battery from the chest compression device may require moving a mechanical retaining structure through a range of motion, including an initial range of motion less than a full range of motion required to release the battery from the chest compression device. A sensor for detecting a motion of the retaining structure at a point in the range of motion prior to release of the battery (an initial range of motion), and the sensor operable to generate a signal indicative of said motion and transmit said signal to the control system. The control system is operable to receive the signal indicative of the motion and is programmed to cease writing patient data and/or device data to the storage device upon receiving the signal indicative of said motion. The control system may be operable to (1) complete any writing in progress when the signal indicative of the motion is received, and (2) cease further writing of patient data and/or device data to the media upon receiving the signal indicative of the motion, within the predetermined time period. The battery retainer may be further configured such that the time required for a user to move the retaining structure from the initial range of motion through the full range of motion exceeds the predetermined time period.

FIGS. 6 through 10 illustrate the operation of such a battery disconnection detection mechanism which detects an attempt to remove the battery and saves various data upon detection during a short period required for an operator to complete actions required to remove the battery. The chest compression device includes a control system operable to control operation of the chest compression device to perform repeated compression cycles when the device is fitted about a patient's chest, and also to collect patient data and/or device data (such as the operating start times and stop times, battery life, compression rates, compression depths, total compressions applied and compressions pauses used, and other quality metrics) detected by sensors associated with the system to a storage device. In such a device, it would be advantageous to detect an attempt to remove the battery and, in response to this detection, operate the control system to save collected data to the storage device and cease writing to the storage device, and optionally inhibit the removal of the battery until the control system has completed these tasks.

Figure 6:
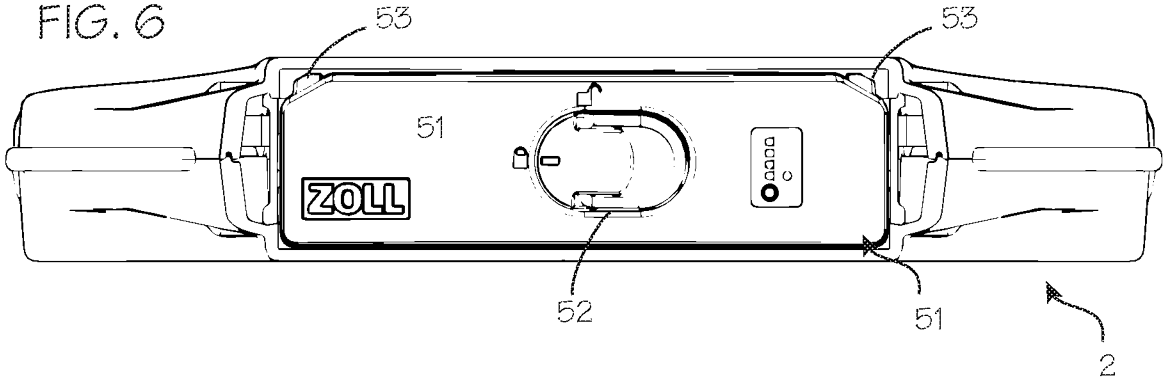
FIGS. 6 through 10 illustrate the operation of the battery disconnection detection mechanism which detects an attempt to remove the battery and saves various data upon detection during a short period required for an operator to complete actions required to remove the battery.
Figure 7:
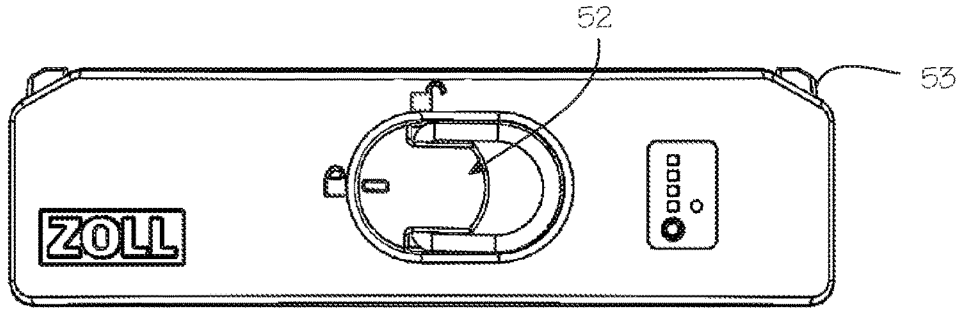
Figure 8:
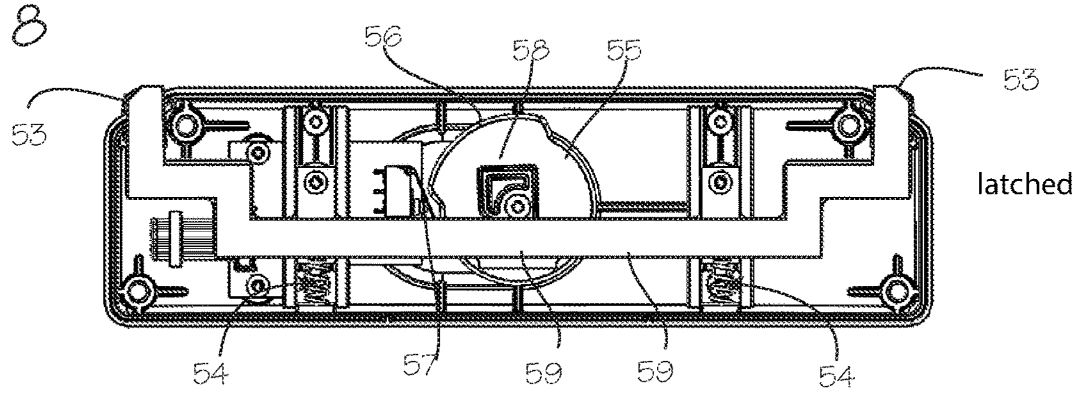

FIG. 6 is a superior view of the CPR chest compression device 2 showing a battery cover 51 which covers and retains the battery in the battery compartment. The cover is shown in isolation in FIGS. 7 through 10. The battery cover includes battery retainer components interoperable with battery retainer components, in the housing. The battery retainer components may include a fastener, latch, clip, clamp or other fastening or latching connection mechanism. The battery cover may further include an operating mechanism (e.g., manual or automated) configured to detect an action required for battery removal, generate a signal corresponding to detection of the action required for removal and transmit this signal to the control system, and require a further action to remove the battery. The further action may require a period of time, between initiation and completion, sufficient for the control system to save data generated by other components of the system to a storage device, such that the data is saved to the storage device before the battery is removed. The battery cover shown in FIGS. 6 through 10 is an example of such a system. The components of the battery cover can be applied directly to the battery, or the battery cover can be fixed to the battery, or, as illustrated, the battery cover can be provided as a discrete component separate from the battery. As shown in FIG. 7, the cover includes a manually-operated actuator 52, operable by the operator to force a cam plate to rotate, and thus force the battery retainer component, which is a latch component in this example, downwardly (posteriorly, in relation to a patient to which the CPR compression device is attached). As shown in FIG. 8, the cover includes one or more latch components 53 which are configured to engage with corresponding latch components in the housing 5. The latch components are biased toward an engaging position by springs 54 or other biasing mechanism. A cam plate 55 with a first cam lobe 56 which is located on the cam so as to impinge on a contact switch 57 when rotated through a first arc.

The cam plate may include a second cam lobe 58, not co-planar with the first cam lobe 56, near a follower 59 fixed to the latch component 53, such that rotation of the cam plate (through a second arc, greater than the first arc) results in impingement of the lobe on the follower, and thus forces the latch component to move away from the center of the cam plate, and thus, in the illustrated configuration, downwardly against the force of the springs and out of engagement with the latch component(s) on the housing. The first cam lobe 56 acts on the contact switch 57 at a first radial position on the cam plate, and the second cam lobe 58 acts on the latch mechanism follower 59 (or directly on the latch mechanism) at a second radial position on the cam plate. The sensor is substantially co-planar with the first cam lobe and the first latch component (the latch component 53 or its associated follower 59) is substantially co-planar with second lobe of the cam plate. The first radial position is displaced (advanced) around the cam lobe, in the direction of rotation of the cam plate, relative to the second position, such that the first cam lobe makes contact with the contact switch before the second cam lobe forces the cam follower downwardly to the extent necessary to force the latch component downwardly and out of engagement with the latch components on the housing. The control system of the device is operable to detect contact between the first cam lobe and the contact switch, and it is programmed such that, upon detection of contact between the first cam lobe and the contact switch, the control system will operate to save any patient data and/or device data collected by sensors associated with the system to storage device. This can be accomplished by the control system in a short period of time, before an operator can further rotate the actuator to the extent necessary to bring the second cam lobe into impingement with the cam follower to the extent necessary to force the latch component downwardly and out of engagement with the latch components on the housing.

Figure 9:
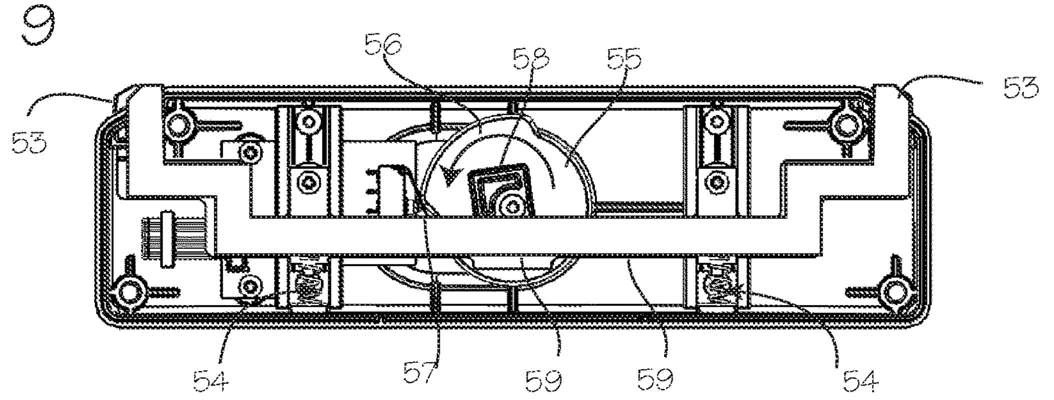
Figure 10:
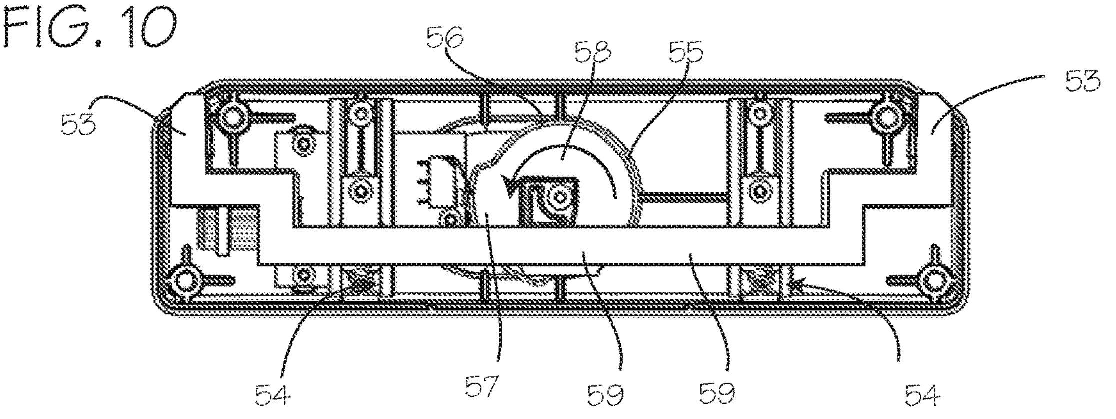

When the battery is locked into the housing, the cam plate is positioned relative to the contact switch and follower as shown in FIG. 8, where the first cam lobe is arcuately displaced from the contact switch, and the second cam lobe is arcuately displaced from the follower. As shown in FIG. 9, when the operator rotates the cam plate through a first arc, the first cam lobe is arcuately aligned with the contact switch, while the second cam lobe is still arcuately displaced from the follower, so that the contact switch is actuated but the latch components are not moved. As shown in FIG. 10, upon further rotation of the cam plate, the second cam lobe rotates into alignment with the follower to force the follower and latch component downwardly.

The battery removal detection mechanism and sensor can be implemented in many ways. The contact switch is just one of many means or mechanisms for detecting operator action preceding battery removal. Other such means or mechanisms can include any form of contact or proximity sensor operable to sense proximity of the cam lobe with the sensing component, or any inductive sensor operable to detect operator contact with the actuator or any inductive sensor operable to detect motion of the actuator, including contact switches, contact relays, magnetic sensors, capacitive sensors inductive sensors, optical sensors, photocells, ultrasonic sensor, or any other means for sensing movement of the actuator. Sensors may include a first sensor component and second sensor component, e.g., a sensor target and a sensing component operable to sense the movement of the sensor target, and either sensor component may be disposed on the actuator or on the battery cover (or elsewhere on the device). A relay switch may comprise an electromagnetic switch operated by a small electric current, with a magnet or electromagnet on one structure (the cam or the cover) and a spring-loaded switch on the other structure, where proximity of the magnet or electromagnet functions to close or open the spring-loaded switch. A change in the switch position may be taken by the control system as a signal indicative of movement of the actuator. A contact switch may comprise a switch on one structure (the cam or the cover) activated by contact with an impinging component on other structure. For example, a reed switch disposed on the cover, operable to be closed by a protrusion on a cam lobe, when the cam is rotated. Closure of the switch may be taken by the control system as a signal indicative of movement of the actuator. A magnetic sensor may comprise a Hall effect sensor on one structure (the cam or the cover), and a magnet on the other structure. Detection of the magnetic field of the magnet may be taken by the control system as a signal indicative of movement of the actuator. A capacitive sensor may comprise a capacitive sensor probe with a sensing electrode on one structure (the cam or the cover), and a conductive target, or a capacitive sensor probe on one structure, combined with a conductive target on the same structure on the opposite side of a channel which accommodates the other structure, operable to sense the entry of other structure (whether conductive or non-conductive) by its effect on the capacitance measured by the capacitive sensor probe. Detection of the target may be taken by the control system as a signal indicative of movement of the actuator. An inductive sensor may comprise a magnetic field oscillator on one structure (the cam or the cover), and a conductive target on the other structure. Detection of a change in the amplitude of the oscillator may be taken by the control system as a signal indicative of movement of the actuator. An optical sensor may comprise photoelectric detectors and optical encoders. Optical encoders, for example, may comprise and encoder scanner on one structure (the actuator or the cover), and an encoder scale on the other structure. Detection of the encoder scale by the encoder scanner may be taken by the control system as a signal indicative of movement of the actuator. A photoelectric sensor may comprise an emitter light source on one structure (the actuator or the cover), and a photodetector the other structure (or a reflector on the other structure and a photodetector on the first structure). Detection of light, or loss of detection of light, from the emitter light source by the photodetector may be taken by the control system as a signal indicative of movement of the actuator. An ultrasound sensor may comprise a transducer on one structure (the actuator or the cover), and a reflective target on the other structure (the structure itself may constitute the target), in a through-beam or reflective arrangement. Detection of light reflected by the target, or alteration of the light by transmission through the target may be taken by the control system as a signal indicative of movement of the actuator.

The battery retainer components may take many forms as well. The latch component for engaging the housing is just one of many latching or fastening mechanisms for securing the battery cover to the housing. Other such mechanisms can include any form of latching or fastening mechanism, including clamps, clips or restraints, a compression latch (pinching actuation), a push button, or pull-out feature mechanism, manually operated or automatically operated by the control system upon input from the user.

The battery cover is just one example of a battery retainer or battery hold-down that may be configured to hold the battery physically in place relative to the housing and in electrical communication with the control system and motor of the chest compression device. Many retaining structures may be used to lock the battery in place, without also serving to cover the battery and protect it from the environment outside the battery compartment. The retainer may comprise a toggle switch or clamp, a rotatable catch fixed to the battery or chest compression device, a drawer lock fixed to the battery or chest compression device, a rotatable threaded lid, a detent pin or ball locking pin.

Various patient and/or device data may be collected by the battery and/or chest compression device as discussed herein. Such data may be recorded and/or transmitted to a remote server or device, allowing for remote management of device or patient data. Exemplary data includes device performance data, such as compression fraction (the amount of time compressions were delivered during a CPR event); compression rate; compression depth; the frequency with which the device met a target depth; device self-test results; fault codes; battery performance; and predictive failure codes or check engine light codes (e.g., battery life or faulting).

Device and battery data may be transmitted in the following ways: Data from the compression device may be transmitted to the battery. The battery may be placed in a charger and data may be transferred from the battery (or the compression device) to the cloud or remote server. A user/manager may log in to their account via the internet to retrieve their device or battery data, e.g., to review their device performance and device data and/or to remotely manage or monitor their devices/assets. A user/manager may monitor chest compression device usage, battery life, etc. Alternatively, a user/manager may retrieve data directly via a USB port or other port present on the device or charger. Data may be transmitted to the cloud or remote server from the battery while the battery is charging.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A device for performing chest compressions on a patient, said device comprising:

a drive spool operably connected to a motor shaft, said drive spool configured for attachment to a belt for compressing the chest of the patient;

a motor for rotating the drive spool, said motor comprising: the motor shaft, a first end having a first aperture, and a second end having a second aperture in communication with the first aperture to enable airflow through the motor, wherein the motor shaft is disposed at the second end;

a compression device housing for housing the motor and the drive spool, wherein said compression device housing is configured to support the patient during operation of the device, said compression device housing forms an enclosure substantially enclosing the motor, and said compression device housing comprises an intake aperture for intake of cooling airflow and an exhaust aperture for exhaust of cooling airflow; and a fan disposed within the compression device housing proximate the second end of the motor and between the second end of the motor and the exhaust aperture of the compression device housing, wherein the fan is arranged to draw air from the intake aperture of the compression device housing and through the first aperture of the motor and force air out of the second aperture of the motor and the exhaust aperture of the compression device housing, whereby the air flows through the motor, wherein at least a portion of the second aperture of the motor and at least a portion of the exhaust aperture of the compression device housing are aligned along a lateral axis of the compression device housing.

2. The device of claim 1, wherein: the enclosure formed by the compression device housing comprises internal surfaces configured to direct air drawn by the fan through the intake aperture to the first aperture of the motor.

3. The device of claim 1, wherein: the enclosure formed by the compression device housing further comprises additional internal surfaces configured to direct air drawn by the fan from the second aperture of the motor through the fan and out the exhaust aperture.

4. The device of claim 1, wherein: the compression device housing comprises a battery compartment configured to hold a battery for powering the motor, said battery compartment disposed between the intake aperture and the first end of the motor, said battery compartment having an internal surface configured to direct air drawn by the fan through the intake aperture over or through the battery.

5. The device of claim 4, wherein: the internal surface of the battery compartment-internal surface is further configured to prevent air drawn by the fan through the intake aperture from flowing through the battery compartment along pathways not at least partially defined by the battery.

6. The device of claim 4, further comprising: a baffle disposed within the compression device housing between the intake aperture of the compression device housing and the first end of the motor such that the baffle separates the battery compartment from the first end of the motor, wherein said baffle comprises an aperture communicating from the battery compartment to the first end of the motor.

7. The device of claim 1, wherein: the motor is a brushed DC motor comprising a commutator and a brush assembly disposed at the first end.

8. The device of claim 1, further comprising a hydrophobic mesh covering the exhaust aperture.

9. The device of claim 1, wherein the intake aperture is in a location in the compression device housing that shields the intake aperture from being blocked or obstructed.

10. The device of claim 9, wherein the location of the intake aperture is recessed relative to a posterior surface of the compression device housing.

11. The device of claim 1, wherein the intake aperture of the compression device housing and the first aperture of the motor are spaced apart to enable airflow therebetween.

12. A system for performing chest compressions on a patient, said system comprising:

a motor comprising: a motor shaft, a first end having a first aperture, and a second end having a second aperture, wherein the motor shaft is disposed at the second end;

a drive train operably connected to the motor shaft, said drive train configured for attachment to a belt for compressing the chest of the patient;

a platform for housing the motor and the drive train, wherein said platform is configured to support the patient during chest compressions, said platform forms an enclosure substantially enclosing the motor, and said platform comprises an intake aperture for intake of cooling airflow and an exhaust aperture for exhaust of cooling airflow, at least a portion of the exhaust aperture of the platform being laterally aligned with at least a portion of the second aperture of the motor;

a fan disposed within the platform proximate the second end of the motor and between the second end of the motor and the exhaust aperture of the platform, wherein the fan is arranged to draw air from the intake aperture of the platform and through the motor via the first and second apertures of the motor and force air out the exhaust aperture of the platform; and a baffle disposed within the platform between the intake aperture of the platform and the first end of the motor, wherein said baffle is configured to direct air drawn by the fan through the intake aperture of the platform to the first aperture of the motor to direct airflow through the motor.

13. The system of claim 12, further comprising:

a battery compartment for holding a battery to power the motor, said battery compartment disposed within the platform proximate the first end of the motor and disposed between the first end of the motor and the intake aperture of the platform; and the battery, wherein the battery, when secured within the battery compartment, defines, relative to the battery compartment, a flow path for air from the intake aperture of the platform to the first aperture of the motor.

14. The system of claim 13, wherein the battery is sized relative to the battery compartment so that the flow path is defined between a surface of the battery and an internal surface of the platform.

15. The system of claim 13, wherein the battery comprises a channel running through the battery, wherein said channel defines the flow path.

16. The system of claim 13, further comprising: a second baffle within the platform disposed between the intake aperture of the platform and the first end of the motor, such that said second baffle separates the battery compartment from the first end of the motor, wherein said second baffle comprises an aperture communicating from the battery compartment to the first end of the motor.

17. The system of claim 12, wherein the motor is a brushed DC motor comprising a commutator and a brush assembly disposed at the first end.

18. The system of claim 12, further comprising a hydrophobic mesh covering the exhaust aperture.

19. The system of claim 12, wherein the intake aperture is in a location in the platform that shields the intake aperture from being blocked or obstructed.

20. The system of claim 19, wherein the location of the intake aperture is recessed relative to a posterior surface of the platform.

* * * * *